United States Patent [19]

Partus

[11] 4,389,231

[45] Jun. 21, 1983

[54] METHOD FOR SUPPLYING FLUID TO A ROTATING TUBE

[75] Inventor: Fred P. Partus, Marietta, Ga.

[73] Assignee: Western Electric Company, Inc., New York, N.Y.

[21] Appl. No.: 268,611

[22] Filed: Jun. 1, 1981

[51] Int. Cl.³ .............................................. C03B 37/07
[52] U.S. Cl. ........................................ 65/3.12; 65/3.2; 427/163; 427/231; 427/237
[58] Field of Search ......................... 65/3.12, 3.2, 157; 427/163, 166, 167, 231, 237, 238

[56] References Cited

U.S. PATENT DOCUMENTS 4,347,069  8/1982  Haney et al. ........................ 65/3.12

Primary Examiner—Richard V. Fisher
Attorney, Agent, or Firm—David P. Kelley

[57] ABSTRACT

A sealed rotary joint and method are described wherein a purge fluid is passed over a tube rotating within an end cap and through a ball bearing component of the joint. A vapor stream including a vaporized glass forming precursor entrained in an oxidizing carrier gas is passed into a rotating optical fiber preform tube through a housing supporting the ball bearing. A stream of the oxidizing carrier gas at a pressure greater than the pressure of the vapor stream can act as the purge fluid.

3 Claims, 3 Drawing Figures

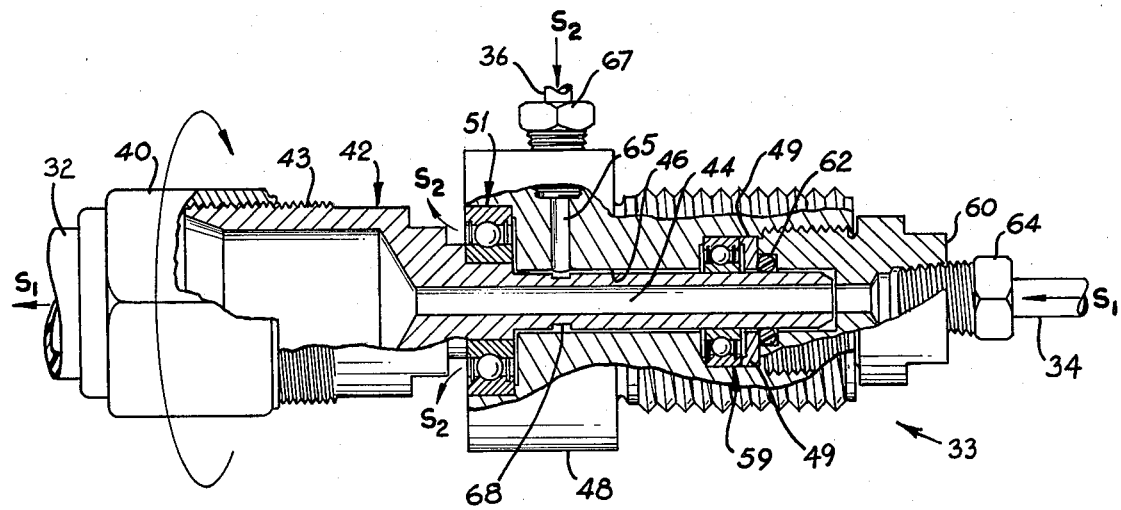
Fig_2
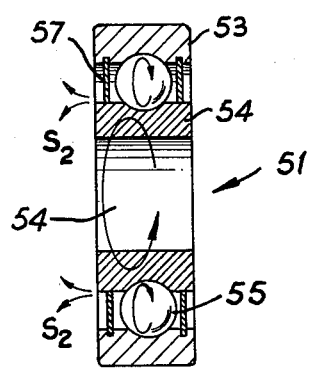
Fig_3

METHOD FOR SUPPLYING FLUID TO A ROTATING TUBE

TECHNICAL FIELD

This invention relates to methods and apparatuses for supplying fluids to rotating tubes such as is done in the manufacture of optical waveguide fiber preforms.

BACKGROUND OF THE INVENTION

Some industrial processes call for the introduction of fluids into rotating tubes. In many such situations it is desirable, if not essential, that this be done without ambient matter becoming entrained with the fluid as it flows from a stationary conduit into the rotating tube. For example, in constructing preforms from which optical waveguide fibers may be drawn, vapors of materials such as $SiCl_4$, $GeCl_4$, $BCl_3$ and $POCl_3$ are entrained in an oxidizing carrier gas such as oxygen. The vapor stream is then drawn through a stationary conduit and into a rotating glass preform starter tube. In order to inhibit the vapor stream from leaking to ambient atmosphere, and ambient air and airbourne inpurities from entering and thereby contaminating the vapor stream, a sealed rotary joint has been provided at the junction of the stationary and rotary tubes. This joint has been provided by locating an end portion of one of the tubes within an end portion of the other tube and positioning one or more resilient O-rings or washers between the two tubes. This arrangement, however, has been less than satisfactory since at least one of the tubes is constantly rubbing against the resilient O-rings causing them to become heated and to wear out. Structural deteriorations of the O-rings soon leads to leakage which is aggravated whenever, as here, there is a pressure differential between the fluid stream and ambient atmosphere. Furthermore, in such highly controlled situations as optical waveguide fiber preform manufacture even a very slight leak can create severe problems. For example, a PPM leak to ambient surroundings can endanger personnel since the vapor stream is highly toxic. Such leakage will also alter the rate of vapor stream flow into the preform which rate much be precisely controlled and maintained. Conversely, an ingress of ambient air will also alter the flow rate as well as contaminate the vapor stream with water vapor and airbourne impurities.

As shown in U.S. Pat. No. 347,069 which is assigned to the assignee of the present invention and application, improvements have recently been made in the art of introducing a vapor stream into a rotating optical fiber preform tube. The method disclosed in that application comprises the steps of generating a vapor stream comprised of a vaporized gas-forming precursor entrained in an oxidizing carrier gas, and flowing the vapor stream into the rotating optical fiber preform tube through an at least partially sealed rotary joint. Any material alteration in the composition of the vapor stream is prevented from occurring should the rotary joint seal become leaky by flowing a stream of fluid consisting essentially of the same oxidizing carrier gas as that in the vapor stream over and about the rotary joint at a pressure greater than the pressure of the vapor stream flowing through the rotary joint. With this method any ingress of ambient fluid into the preform tube at the rotary joint is in the form of a component of a vapor stream itself passing therethrough and a very small percentage of it at that. In this manner the qualitative composition of the vapor stream is maintained.

In the just mentioned application apparatus is also disclosed for supplying fluid to the rotary tube which includes an end cap having an open ended bore in which an end portion of a tube is rotatably positioned. Conduit means extend into the end cap through which fluid may be fed into the rotary tube while other conduit means communicate with the end cap bore through which a purge fluid may be fed into and at least partially through the bore to the exterior of the end cap.

Though the lastly described development has provided distinct advantages there nevertheless have remained certain problems associated with its use. For example, the end of the tubular extension of the preform has had to be rotatably positioned within a cylindrical cavity of the end cap with but a very small clearance present between the stationary end cap bore wall and the rotating tubular extension periphery. Too large a clearance increases the danger of ambient air ingressing into the housing and then into the tube. Conversely, too small of a clearance increases the danger of binding occurring between the two joint members. This is particularly true due to the temperature cycling associated with optical fiber preform manufacture and the heat conducted by the tubular extension from the preform that is being selectively heated to very high temperatures. Furthermore, since the optical fiber preform is composed of glass it often is out of round and/or bowed whereby its rotation causes the tubular extension thereof to wobble somewhat as it itself rotates along with the preform within the end cap. Such wobbling further increases the difficulty of maintaining a proper clearance between the rotating and stationary members of the rotary joint and increases the danger of binding.

Other prior art methods of sealing rotary joints in other technical applications have included the use of magnetizable fluids and ball bearings. For example, in U.S. Pat. No. 2,557,140 a magnetizable fluid is provided in a chamber disposed between two hollow members of the joint. Means also provided for magnetizing the fluid in the chamber to solidify it and thereby seal the joint. Such an approach though cannot be used in environments where any ingress of fluid into the joint from about the seal is in any form other than that of a constituent of the fluid being conveyed through the joint. U.S. Pat. No. 3,889,980 discloses another rotary joint which has a conduit with its inner end mounted within a housing in fluid communication with a housing passageway. Here, ball bearings are mounted in the housing surrounding the conduit and sealing means provided in the form of two sealing elements have opposing, mutually contacting seal faces which prevents fluid from reaching the ball bearings. The use of contacting faces, however, leads to friction and wear over a relatively brief period of time thereby limiting the effectiveness of such seals.

It thus is seen to remain a need for providing effective methods and apparatuses for supplying fluids to rotating tubes as is done in the manufacture of optical waveguide fiber preforms. It is to this task to which the present invention is primarily directed.

SUMMARY OF THE INVENTION

In one form of the invention a method is provided for introducing a vapor stream into a rotating optical fiber preform tube. The method comprises the steps of flowing a vapor stream comprised of a vaporized gas forming precursor entrained in an oxidizing carrier gas into the rotating optical fiber preform tube through an at least partially sealed rotary joint that has a tubular housing supporting a ball bearing through which a tubular extension of the preform tube is journalled. A stream of the oxidizing carrier gas is flowed into the rotary tube housing, about the rotating preform tubular extension, and through the ball bearing to ambient air at a pressure greater than the pressure of the vapor stream flowing through the rotary joint. In this manner ambient air is prevented from entering the vapor stream and any portion of the vapor stream prevented from contaminating the ball bearing and escaping into ambient air should a leak occur in the sealed rotary joint.

In another form of the invention a method is provided for introducing a vapor stream into a rotating optical fiber preform tube wherein a journal portion of a tubular extension of the preform tube is positioned within a generally cylindrical bore of an end cap with the extension journal rotatably supported on an outer ball bearing mounted to the end cap adjacent the bore outlet and on an inner ball bearing mounted within the end cap spaced along the bore from the outer bearing. The preform tube and tubular extension are rotated and a vapor stream comprised of a vaporized glass forming precursor entrained in an oxidizing carrier gas flowed into the end cap, through the rotating extension journal, and into the rotating preform tube. Another stream of the oxidizing carrier gas is also flowed along another path into the end cap bore between the inner and outer bearings about the rotating extension journal and through the outer ball bearing to ambient atmosphere.

In yet another form of the invention, apparatus is provided for supplying fluid to a rotary tube substantially uncontaminated with ambient air. The apparatus comprises an end cap having an open ended bore in which an end portion of the tube may be rotatably positioned. An outer ball bearing is mounted to the end cap about the bore adjacent the open end. Conduit means extend into the end cap and communicate with the bore through which fluid may be fed into the rotary tube journalled within the bore and outer ball bearing. Other conduit means communicate with the end cap bore through which a purge fluid may be fed into and at least partially through the bore and the outer ball bearing about the rotary tube to ambient atmosphere.

BRIEF DESCRIPTION OF THE DRAWING

FIG. 2 is a side elevational view, in cross section, of the sealed rotary joint component of the apparatus illustrated in FIG. 1.

FIG. 3 is an enlarged cross-sectional view of the outer ball bearing component of the rotary joint shown in FIG. 2.

DETAILED DESCRIPTION

Figure 1:
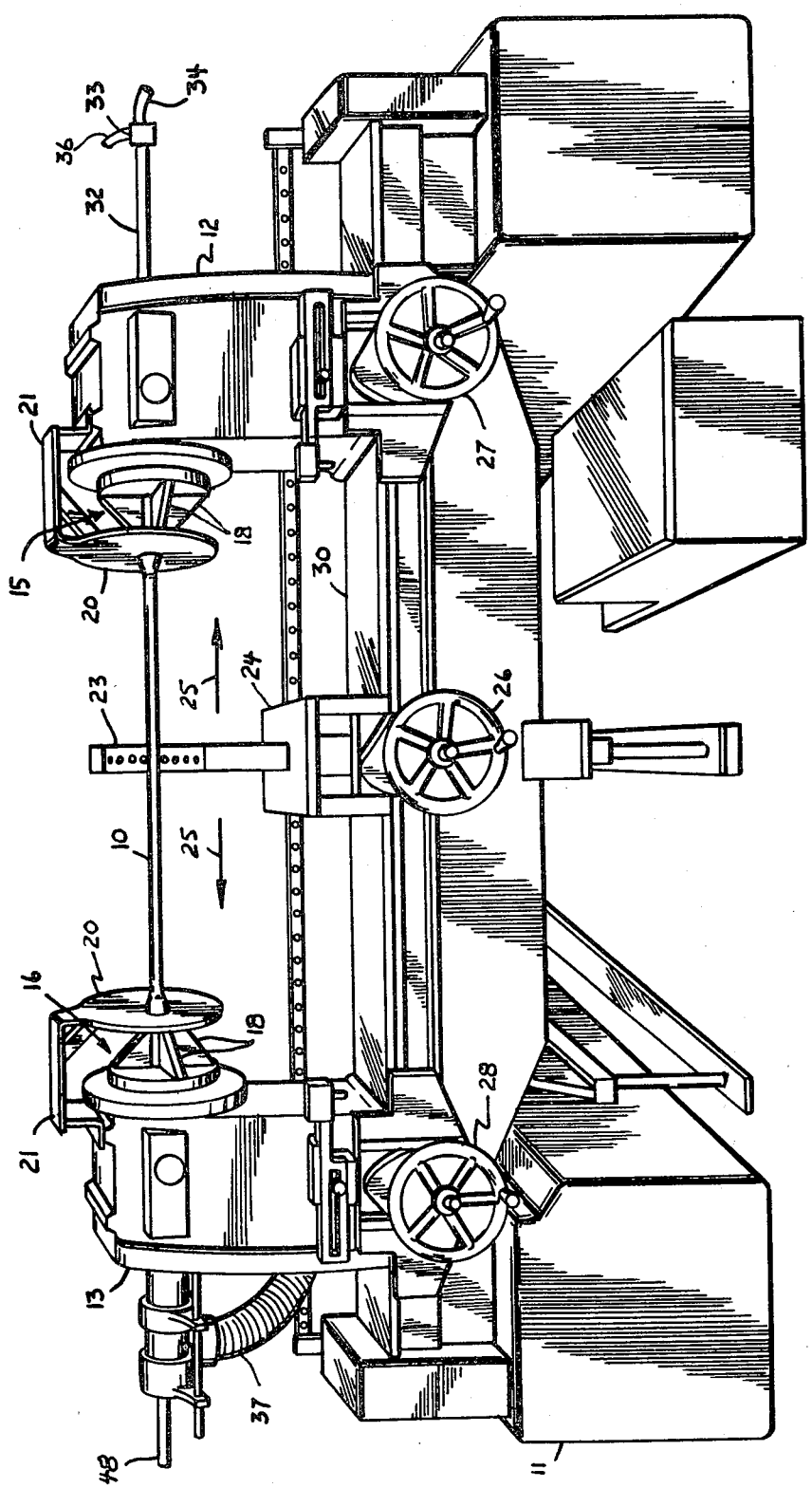
FIG. 1 is a perspective view of the lathe to which an optical fiber preform tube is rotatably mounted for chemical vapor deposition therewithin.

Referring now in more detail to the drawing, there is shown in FIG. 1 a lathe for forming an optical fiber preform by a vapor deposition process wherein chemical reaction products are deposited on the interior surface of a glass preform starter tube 10. The lathe includes a frame 11 atop which a headstock 12 and a tailstock 13 are mounted. The headstock 12 and its internal mechanisms rotatably support and drive a chuck 15 while the tailstock 13 and its internal mechanisms similar rotatably support and drive chuck 16 about a common axis with that of chuck 15. Each of the chucks is comprised of radially spaced jaws 18 which are adapted to be moved into and out of gripping engagement with the preform tube or with a tubular extension thereof. Centrally apertured heat shields 20 are mounted by pendants 21 to both stocks closely adjacent the rotatable chucks. A hydrogen-oxygen torch 23 is mounted atop a carriage 24 for reciprocal movement between the two heat shields 20 as indicated by arrows 25. The torch 23 is reciprocated by an unshown, automated drive mechanism which can be manually overridden and positioned by a handwheel 26. Similarly, the lateral position of the headstock 12 may be adjusted by a handwheel 27 atop a rail 30 while the position of the tailstock may be manually adjusted over the rail by movement of handwheel 28. A glass "handle" tube 32 fused to the preform tube 10 extends laterally out from the headstock 12 to a sealed rotary joint schematically illustrated at 33 in FIG. 1. A conduit 34 extends from the rotary joint to an unshown vapor stream supply source while another conduit 36 extends from the joint to a pressurized oxygen tank. An exhaust hose 37 extends from the tailstock to unshown scrubbers while a scraper rod 48 extends into the tailstock for periodic cleaning purposes.

In FIGS. 2 and 3 the sealed rotary joint is seen to include a nut 40 which is secured by the use of an unshown swagelock or other type of conventional tube connector snuggly to an end of the glass handle tube 32. A tubular preform extension 42 has a relatively large portion 43 threadedly secured within the nut 42 and an elongated, relatively slender portion 44 positioned within an open ended bore 46 of a stationary end cap 48.

The rotary joint 33 also has an outer ball bearing 51 mounted to the end cap 48 adjacent the open end of bore 46. An outer bearing race 53 is rigidly secured to the end cap while the inner bearing race 54 is press fitted about the slender portion 44 of the preform extension tube 42. Bearing balls 55 are rotatably held between the two races between two snap-fit, annular dust shields 57. An inner ball bearing 59 is also mounted about the end cap bore 46 spaced inwardly from the outer ball bearing 51. Again, the outer race of this bearing is mounted to the end cap while its inner race is press fitted to the preform extension slender portion 44 with balls rotatably positioned between the two races. While the balls of both bearings are spherical other shapes may be used such as cylindrical rollers and the like. Thus the term "ball bearing" in this application is intended to include such other type bearings having elements rotatably positioned between inner and outer races.

To the other end of the end cap is threaded mounted another nut 60 with an O-ring 62 positioned between it and a spacer 49 about the slender portion 44 of the preform extension tube. A flexible, metallic conduit 34 is placed in fluid communication with the interior of the nut 60 and the extension tube by means of a pipe fitting 64 threaded secured to the nut 60. The other conduit 36 is placed in fluid communication with the end cap bore 44 via a lateral end cap channel 65 by means of another pipe fitting 67 threadedly mounted to the top of the end cap. The junction of the channel 67 with the bore 46 is seen to be at a point between the two ball bearings but substantially closer to the outer bearing 51 than to the inner bearing 59 and above an annular recess 68 formed in the periphery of the preform extension tube.

During chemical vapor deposition the preform tube 10 is rotated by chucks 15 and 16. A stream $S_1$ of the aforementioned toxic vapors entrained with oxygen as a carrier gas if fed into the preform tube 10 and its handle tube 32 through pipe fitting 64, nut 60 and the extension tube 42 members of the rotary joint. As the vapor stream is passed through the rotating preform tube the torch 23 is slowly moved along it repeatedly thereby causing a chemical reaction to occur within the band of heat created by the torch and the products of the reaction to be deposited on the interior surface of the preform tube. The carrier gas, along with an undeposited reaction products, is exhausted out of the preform tube 10 through the exhaust tube 37 to which suction is applied.

As the vapor stream $S_1$ is being fed through the rotary joint and into the preform tube a stream of pure oxygen $S_2$ is also fed into the end cap bore 46 through channel 65. This oxygen stream initially contacts and flows around the extension tube 42 at recess 68. From here most of the oxygen stream flows towards the outer ball bearing 51 which is open to ambient atmosphere since the stream is inhibited from flowing towards the inner bearing 59 due to the relative long, small annular path thereto within the bore about the extension tube, and due to the fact that this path is essentially sealed by the bearing and O-ring 62. The oxygen flowing through the outer bearing passes over the edge of the loosely fitted annular dust shields 57 to ambient atmosphere as indicated by arrows $S_2$ in FIG. 3. Conversely, the inner bearing 59 is essentially statically filled with oxygen under positive pressure that is established above the pressure of the vapor stream $S_1$ flowing into the extension tube. This positive pressure differential prevents any of the vapor stream from entering the inner or outer bearing and escaping into the ambient atmosphere. Conversely, should any of the oxygen stream manage to seep past the O-ring and enter the vapor stream, it only provides a very slight increase in the oxygen proportion of that stream and does not make a compositional alteration to the vapor stream.

With the just described apparatus significant wobbling of the preform does not cause the clearance between the extension tube slender portion 44 and the wall of the end cap bore 46 to change. This is due to the fact that the conduit 34 to which the end cap 33 is mounted is flexible. This permits the end cap to "float" and move in cooperation with any wobbling motion of the preform tube 10 and handle tube 32 plus the fact that the extension tube 42 is journalled through the two mutually spaced ball bearings. This permits the annular spacing between the extension tube and end cap bore wall to be minimized without danger of mutual contact or binding between joint members. This small clearance in turn minimizes the flow of oxygen over the rotating extension tube towards its open end adjacent O-ring 62. The positive pressure and flow patterns of the oxygen stream also cleans and cools the bearings and prevent either the corrosive and toxic vapors from contaminating the bearings or ambient moisture from entering the bearings during deposition. In this manner, a highly effective sealed rotary joint is provided.

It should be undertood that the just described embodiment merely illustrates principles of the invention in one preferred form. Many modifications, additions and deletions may, of course, be made thereto without departure from the spirit and scope thereof as set following claims.

What is claimed is:

1. A method of introducing a vapor stream into a rotating optical fiber preform tube, comprising the steps of:
   (a) flowing a vapor stream comprised of a vaporized glass forming precursor entrained in an oxidizing carrier gas into the rotating optical fiber preform tube through an at least partially sealed rotary joint that has a tubular housing supporting a ball bearing through which a tubular extension of the preform tube is journalled; and
   (b) flowing a stream of the oxidizing carrier gas into the rotary joint housing, about the rotating preform tube extension and through the ball bearing to ambient air at a pressure greater than the pressure of the vapor stream as it flows through the rotary joint whereby ambient air is prevented from entering the vapor stream and any portion of the vapor stream from contaminating the ball bearing and escaping into ambient air should a leak occur in the sealed rotary joint.

2. A method of introducing a vapor stream into a rotating optical fiber preform tube comprising the steps of:
   (a) positioning the journal portion of a tubular extension of the preform tube within a generally cylindrical bore of an end cap with the extension journal rotatably supported on an outer ball bearing mounted to the end cap adjacent the bore outlet and on an inner ball bearing mounted within the end cap spaced along the bore from the outer bearing;
   (b) rotating the preform tube and tube extension;
   (c) flowing a vapor stream comprised of a vaporized glass forming precursor entrained in an oxidizing gas into the end cap, through the rotating extension journal and into the rotating preform tube; and
   (d) flowing a stream of said oxidizing carrier gas into the end cap bore between the inner and outer bearing about the rotating extension journal and through the outer ball bearing to ambient atmosphere.

3. The method of claim 2 wherein step (d) the stream of oxidizing carrier gas flows about the rotating extension journal and also into the inner ball bearing.

* * * * *